United States Patent [19]
Law

[11] Patent Number: 5,378,089
[45] Date of Patent: Jan. 3, 1995

[54] APPARATUS FOR AUTOMATICALLY FEEDING HOT MELT TANKS

[76] Inventor: R. Thomas Law, 17314 Noakes Rd., Vernonia, Oreg. 97064

[21] Appl. No.: 24,365

[22] Filed: Mar. 1, 1993

[51] Int. Cl.⁶ .............................................. B65G 53/24
[52] U.S. Cl. ...................... 406/123; 406/23; 406/33; 406/38; 406/137; 406/143; 406/153
[58] Field of Search ....... 406/23, 32, 33, 38, 406/123, 134, 137, 141, 143, 144, 152, 153

[56] References Cited
U.S. PATENT DOCUMENTS

| | | | |
|---|---|---|---|
| 2,716,050 | 8/1955 | Hagerbaumer | 406/33 X |
| 4,105,256 | 8/1978 | Parker et al. | 406/153 X |
| 4,505,623 | 3/1985 | Mulder | 406/153 X |
| 4,834,587 | 5/1989 | Crawley | 406/23 |

Primary Examiner—David M. Mitchell
Assistant Examiner—Andrew C. Pike
Attorney, Agent, or Firm—James D. Givnan, Jr.

[57] ABSTRACT

One or more hot melt tanks are each periodically supplied by an air conduit which automatically transfers pellets from a storage container. A transducer assembly, positionable in the container, includes a vacuum transducer for the pick up of glue pellets for transfer via the air conduit. A vibrator imparts motion to the pellets to prevent bridging of same. Each hot melt tank includes a level switch with a probe which provides a signal to a control panel having relays which in turn actuate solenoid valves for the delivery of a pressurized air flow to one or more vacuum transducers. A portion of the pressurized air flow is bled off for supplying the vibrator in place on a base of the transducer assembly.

2 Claims, 1 Drawing Sheet

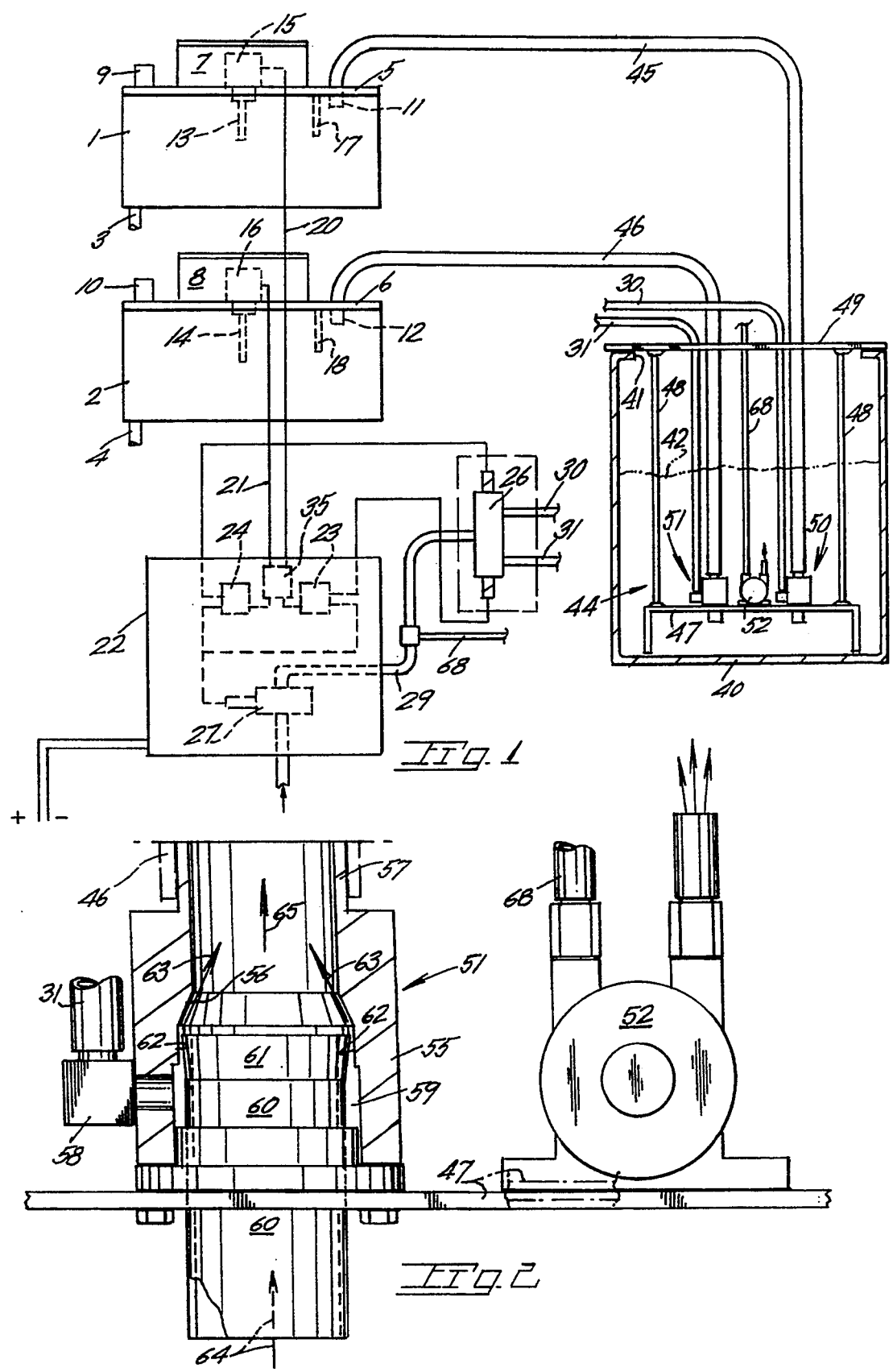

APPARATUS FOR AUTOMATICALLY FEEDING HOT MELT TANKS

BACKGROUND OF THE INVENTION

The present invention concerns generally equipment for automatically supplying various receptacles upon a demand signal generated by a level actuated switch in the receptacle.

In use today are receptacles termed hot melt tanks in which pellets of adhesive material are melted to provide a source of liquid adhesive. Such hot melt tanks require continuous attention to insure periodic resupply of adhesive pellets as serious problems are encountered when a hot melt tank empties such as the formation of char in the tank and clogging of applicators. Further, operation of a partially full hot tank is not efficient as maximum melting capacity is not maintained.

In the prior art are level switches which include a probe for disposition within a vessel or tank with the probe sensing a level or levels of the tank. The switch provides a signal to a fluid pump to drive same until the tank is filled to a high set point at which time pump operation is automatically stopped.

A problem exists when discreet material is being handled, as for example adhesive pellets, which must be fed to a hot melt tank from which the liquid adhesive is delivered to various glue application devices.

In the prior art U.S. Pat. No. 4,834,587 discloses a conveying system for particulate material wherein material transfer is accomplished by pneumatic means. Additionally disclosed are air jets which discharge into a hopper to agitate the stored material.

SUMMARY OF THE PRESENT INVENTION

The present invention is embodied within an apparatus for automatically transfering discreet material from a storage container to a receptacle such as a hot melt tank.

In the present apparatus one or more hot melt tanks are each equipped with a level switch having a probe which detects when the heated liquid reaches a lower limit. The level switch transmits a signal to a remote receiver in which relay means are actuated to control an air flow to a storage container for the pick up of discreet material and the transfer of same to the hot melt tank. An agitator, such as a vibrator, is associated with a vacuum transducer located in the storage container to facilitate pick up of the discreet material by the transducer. The present apparatus is particularly suited for installation within portable containers in which the discreet material is delivered from a supplier. In a modified form of the present apparatus provision is made for feeding discreet material to multiple hot melt tanks each equipped with a level switch in circuit with a control panel. The vacuum transducer ejects a continuous annular flow of air into a transfer conduit for the pick up of material in the portable container and propelling of same through the conduit to a tank. The installation of an agitator such as a vibrator, in place on a support common to the vacuum transducer, insures a constant supply of material to the transducer as bridging of the material is avoided.

Important objectives of the present apparatus include the provision of an apparatus particularly suited for transfering discreet material from portable containers in which the material is shipped From a source of production; the provision of an apparatus for transferring material from a storage container to a receptacle by use of a vacuum transducer temporarily positionable in the storage container and serving to pick up the material as well as propel same with an air flow to a remote receptacle; the provision of an apparatus serving a plurality of receptacles from one storage container to preclude the risk of the receptacles running dry which causes a deposit of char and the clogging of orifices associated with the receptacle; the provision of a hot melt tank with a closure having a baffle depending into the hot melt to prevent the build up of char on a temperature probe.

BRIEF DESCRIPTION OF THE DRAWINGS

In the accompanying drawings,

FIG. 1 is a schematic view of the present apparatus;

FIG. 2 is a fragmentary elevational view of a support located within a storage receptacle and having a vacuum transducer and vibrator.

DETAILED DESCRIPTION OF THE PREFERRED EMBODIMENTS

With continuing attention to the drawings wherein applied reference numerals indicate parts similarly hereinafter identified, the reference numerals 1 and 2 indicate receptacles, termed in the trade, hot melt tanks in which pellets of material such as glue are heated to liquify same to permit flow via outlets 3 and 4 to pumping means and eventually to glue applicator devices. Typically hot melt tanks of the smaller size were manually resupplied at intervals which effort included the removal of a tank cover at 5 and 6 and the deposit of glue pellets into the tank. The tank lids 5 and 6 have been modified to include transmitter housings at 7 and 8, vents at 9 and 10 and pellet inlets at 11 and 12. Additionally in place on each of the covers 5 and 6 are level sensing probes at 13 and 14 with each probe in circuit with a transmitter at 15 and 16. Each probe constitutes a level switch which is opened and closed by melted adhesive contacting the lower most end of each probe. A suitable probe constituting a level switch 13 or 14 is that switch manufactured and sold by Babbitt International, Inc., which level switch employs a radio frequency balanced impedance bridge to sense the presence or absence of hot melt material at the tip of the probes. Signals from each transmitter 15 and 16 are transmitted along conductors 20 and 21 to a pair of relays 23 and 24 located in a control panel 22. Each relay is in circuit with a solenoid of a three-way solenoid valve 26 and in parallel with a solenoid valve 27. Accordingly, closure of either of the relays 23 and 24 shifts the spool of valve 27 to provide a flow of pressurized air via a conduit 29 to valve 26 which, depending on which relay is closed, will direct the pressurized air flow out flexible conduits 30 or 31. In those applications of the present apparatus where sequential operation of later described vacuum transducers is necessary by reason of a limited pressurized air flow, the present apparatus may include signal sequencing means at 35 which may be a microprocessor or multiple relays which receive signals from transmitters 15 and 16 and energizes relays 23 and 24 in a sequential manner to ensure vacuum transducer operation or functioning as later described.

A storage container at 40 preferably of the portable type defines an opening at 41 to permit the loading and shipping of adhesive pellets 42 to a using site. A transducer assembly is indicated generally at 44 for installation within container 40 for the purpose of drawing out the pellet material 42 through transfer conduits 45 and 46. Transducer assembly 44 includes a base 47 and frame members 48 and a support 49 which may be in rested engagement with the upper extremity of container 40. Vacuum transducers are indicated generally at 50 and 51 each in place on base 47 along with a material agitating device shown as an air driven vibrator 52. Vacuum transducers 50 or 51, one of which is best shown in FIG. 2, includes a housing 55 having a truncated, conical inner surface at 56. Said housing includes an outlet 57 to which one end of a transfer conduit 45 or 46 is suitably secured. Air line 31 provides a pressurized air flow via a fitting 58 into an air space 59 within housing 55. Pressurized air in space 59 exhausts upwardly along an outwardly flaired annular surface 61 of a transducer inner member 60. Annular wall 61 terminates inwardly offset from an inner wall 62 of the outer member to provide a gap of 0.0025 inch or so to provide an annular nozzle for the directional discharge of air indicated by arrows 63. Accordingly, a reduced pressure is induced in the interior of member 60 to draw the particles 42 upwardly into the transducer member 60 per arrow 64 which pellets are discharged into transducer outlet 57 with pellet flow indicated by arrow 65. To prevent the build up of char on the probes 13 and 14 it has been found beneficial to include barriers or baffles at 17 and 18 which depend from the tank cover 5 and 6 to confine the incoming pellets for discharge directly into the hot melt material.

The hot melt tanks generally at 1 and 2 may be of the types manufactured by ITW Dynatec and by the Nordson Corporation. The covers 5 and 6 of same are modified to support the components described in place thereon.

Pellet agitator 52, when embodied in an air driven vibrator, is served by an air line 68 which is pressurized upon solenoid valve 27 opening upon closure of relay 23 or 24. The base 47 of the transducer assembly is of a displaceable nature and during vibrator operation imparts motion to pellets both above and below the base. Such is accomplished by the joint supporting of the vacuum transducers 50–51 and the vibrator on base 47. Air exhausted from the vibrator also serves to agitate the glue particles as shown in FIG. 1.

A satisfactory embodiment of the present apparatus includes a vacuum transducer having an inside diameter of 1.250 inch supplied by an air source at 60 psi–20 cfm to transfer pellets up to ⅜ inch square and ⅛ inch thick.

The hot melt tanks operate at greater thermal efficiency when fed in small quantities at closely spaced intervals as opposed to charging the tanks with large quantities of pellets at infrequent intervals.

While I have shown but a few embodiments of the invention, it will be apparent to those skilled in the art that the invention may be embodied still otherwise without departing from the spirit and scope of the invention.

Having thus described the invention, what is desired to be secured by a Letters Patent is:

1. An apparatus for automatically transferring discrete material for processing purposes, said apparatus comprising, a storage container for the discrete material and having an opening, a receptacle for intermittently receiving material from said storage container and including a level switch and a transmitter in circuit therewith for providing a signal upon the level of material reaching a predetermined depth in said receptacle, and a cover, said level switch and said transmitter supported by said cover, a baffle depending from said cover, a transfer conduit communicating said storage container with said receptacle, a control panel including switch means actuated by said signal, valve means in circuit with said switch means and in communication with an air pressure source, and a transducer assembly including a base in said storage container, a vacuum transducer on said base with an inlet for receiving the discrete material and having an annular nozzle served by said air pressure source for injecting an airflow and said discrete material induced by the airflow into said transfer conduit for delivery to said receptacle.

2. An apparatus for automatically transferring discrete material for processing purposes, said apparatus comprising, a storage container for the discrete material and having an opening therein, receptacles for intermittently receiving material from said storage container, each of said receptacles including a level switch and a transmitter in circuit thereiwth for providing a signal upon the level of material reaching a predetermined depth in each of said receptacles, transfer conduits each communication said storage container with one of said receptacles, a control panel remote from said receptacles and including switch means responsive to said signal from the transmitter of each of said receptacles, valve means actuated by said switch means and in communication with an air pressure source, and signal sequencing means receiving a signal from each transmitter to actuate said switch means in a sequential manner, a transducer assembly including a base in said storage container and having vacuum transducers on said base, said vacuum transducers each including an inlet for receiving the discrete material and an annular nozzle served by said air pressure source for injecting an airflow into one of said transfer conduits to induce and propel the discrete material to the receptacles.

* * * * *